May 24, 1927.

M. ANTHONY

CRANK

Filed June 1, 1925

1,629,469

Inventor.
Mark Anthony
by Parker + Carter
Attorneys

Patented May 24, 1927.

1,629,469

UNITED STATES PATENT OFFICE.

MARK ANTHONY, OF CLERMONT, FLORIDA, ASSIGNOR TO ANTHONY COMPANY, OF STREATOR, ILLINOIS, A CORPORATION OF ILLINOIS.

CRANK.

Application filed June 1, 1925. Serial No. 33,879.

This invention relates to a means for cranking or starting the motor of a traction engine, and particularly to such means as applied to a traction engine upon which is mounted a shovelling frame structure. It has for one object to provide means for starting the engine from the rear of the tractor although the motor is situated at the front. Another object is to provide at the front of the engine a starting gear mechanism which takes a minimum of room and thus allows the shovelling frame to be mounted close to the front of the tractor proper. Other objects will appear from time to time throughout the specification and claims.

My invention is illustrated more or less diagrammatically in the accompanying drawings, wherein:—

Like parts are designated by like characters throughout.

Figure 1:
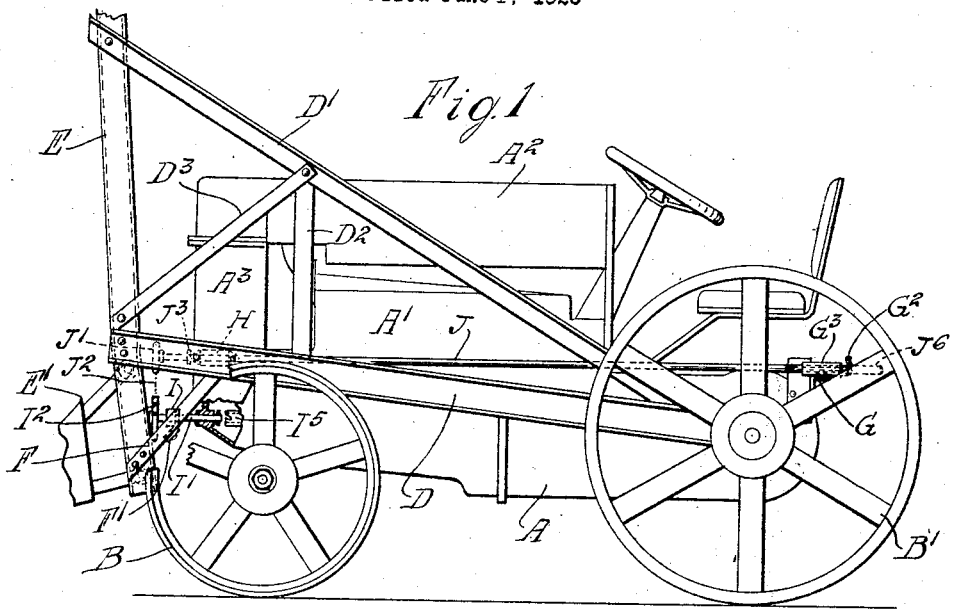
Figure 1 is a side elevation of a tractor with parts broken away and parts in section.
Figures 2, 3, 4:
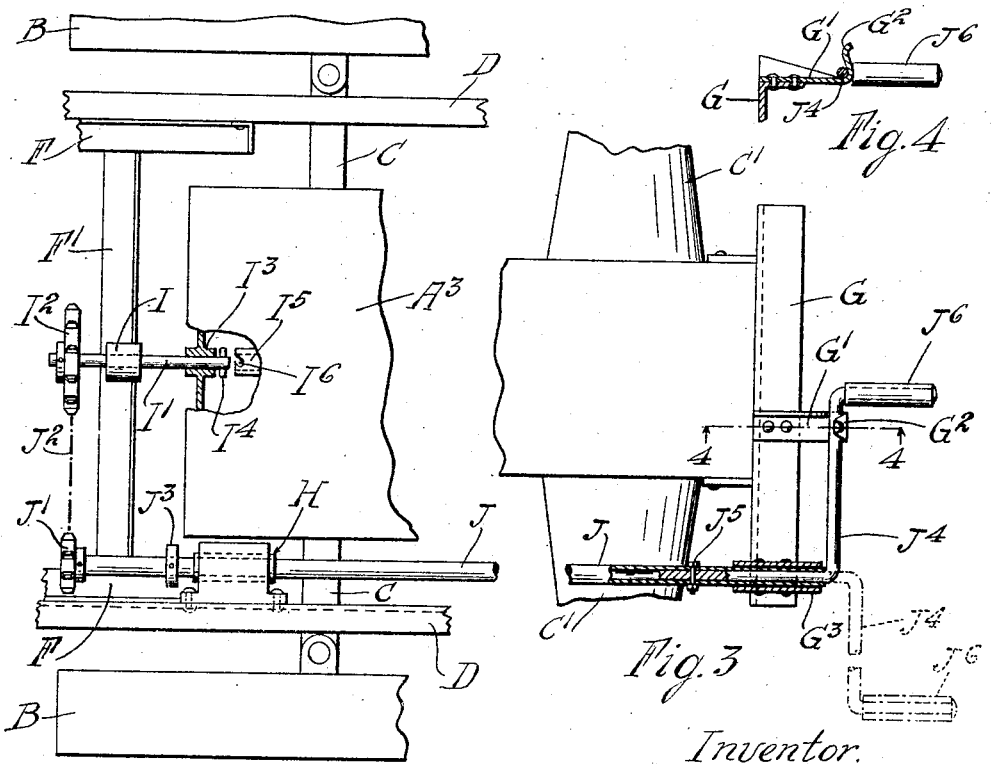
Figure 2 is a plan view on an enlarged scale showing the forward end of the tractor and starting gear with parts broken away and parts in section.
Figure 3 is a fragmentary plan view of the rear of the tractor showing the starting crank with parts in section.
Figure 4 is a detailed vertical section taken on the line 4—4 of Figure 3.

A is a tractor having an engine $A^1$, fuel tank $A^2$, radiator housing $A^3$, provided with front wheels B and rear wheels $B^1$, a front axle C and a rear axle $C^1$ Fig. 3, the engine frame and transmission housing forming the frame of the vehicle and supporting the front and rear axle.

Mounted upon the tractor is a shovel supporting frame work, the details of which form no particular part of the present invention. It is sufficient to say that there are main side frame members D, D to the rear of which inclined side frame members $D^1$ are mounted and supported by a vertical member $D^2$ and an angular bracing member $D^3$. Carried at the forward end of the members D $D^1$ is a track E along which a bucket $E^1$ may be moved by any suitable mechanism, the details of the track, bucket and bucket hoisting mechanism, however, are not shown.

Bracing the lower end of the track E and attached to it and the side members D are braces F, which carry the transverse member $F^1$.

Fastened to the rear of the tractor is an angle G upon which is mounted a supporting clip $G^1$ Figs. 3 and 4 provided with an inwardly bent spring end $G^2$. Adjacent one end of the member G is mounted a bearing $G^3$ which may be comparatively loose.

Adjacent the forward end of one of the members D is a bearing H. It is mounted in a suitable housing at that point.

Mounted in the center of the member $F^1$ is a bearing I. Journaled in this bearing is a short shaft $I^1$ which carries at its outer end a sprocket wheel $I^2$. Its inner end passes through a bearing $I^3$ in the end of the engine or crank casing and carries a pin $I^4$. $I^5$ is the forward end of an extension from the crank shaft which is joined to and rotates with it. It is provided with a pair of inclined slots $I^6$.

J is the starting crank shaft. It is provided at its forward end with a pinion $J^1$ which through a link chain $J^2$ is joined to the sprocket $I^2$. $J^3$ is a collar adjustably mounted on the shaft J between the bearing H and the pinion $J^1$. The shaft J may be solid or in tubular form as shown. Into its rear end is inserted a crank $J^4$ which is held in position by a bolt $J^5$ or other suitable means. The crank is provided with a handle $J^6$.

My construction therefore provides a means for cranking the engine from the rear and which takes very much less room at the front of the engine than the crank alone. Thus the shaft supporting frame can be moved close to the front of the engine to avoid waste of space, to bring its weight farther to the rear, and thus to avoid the danger of raising the rear wheel from the ground when the shovel is full. In addition to this, the engine being cranked from the rear, the operator may stand in the open and is in no danger of being injured while cranking, whereas in other forms if the operator is required to stand close in beneath the shovel framework, he is in great danger. Since the crank pinion is smaller than the sprocket or gear wheel mounted on the stub shaft, a reduction is provided and thus a stiff motor can be turned over by the hand crank much more readily than would be the case where no reduction was provided.

Although I have shown an operative device, still it will be obvious that many changes might be made in size, shape and arrangement of parts without departing materially from the spirit of my invention, and I wish, therefore, that my showing be taken as in a sense diagrammatic.

The use and operation of my invention are as follows:

When the engine is running or not running the parts are in the position shown in full lines in the figures. When it is desired to crank the engine, the crank handle is raised from the supporting clip and it is pulled to the rear. This, of course, pulls the long tubular shaft carrying the pinion at its forward end.

Rearward movement of the shaft is limited by the collar $J^3$ which contacts the forward bearing of the shaft. When the shaft is so moved to the rear, the pinion $J^1$ is moved out of line with the sprocket wheel $J^2$. Sometimes this movement alone moves the sprocket $I^2$ and the shaft on it to the rear, holding the two generally in line and bringing the pin $I^4$ into the slots $I^6$ of the member $I^5$. When this does not take place, then rearward movement of the crank handle shaft, as soon as the crank is turned over, the sprocket wheel being rotated from the pinion by the chain, tends to move it in line with the pinion and is thus brought to the rear and the pin $I^4$ is moved into the slot $I^6$ and in this position the engine may be cranked. As soon as the engine starts the stub shaft is forced forward as the pins $I^4$ are forced out of the slots $I^6$ in the manner usual to such constructions.

The arrangement of the pinion and sprocket is such that the pinion can be moved farther to the rear than the sprocket. This is made possible by the mounting of the bearings of the shaft J which carries the pinion $J^1$. This mounting of the parts makes certain the movement of the sprocket $I^2$ and the shaft $I^1$ to the rear because whatever the starting position of the sprocket, the pinion can be moved well to the rear, thus bringing it out of line. When the pinion is rotated, the chain rotates the sprocket, and sufficient pressure is always brought upon the latter to move it to the rear so that the pin $I^4$ engages the slots $I^6$ and the motor can be turned over.

I claim:

In combination with a tractor having an engine mounted thereon, means for cranking said engine from the rear, said means including a shaft running from front to rear, said shaft mounted for rotary and longitudinal movement, and carrying at its forward end a pinion and at its rear end a crank handle, and means for holding the shaft against movement in combination with a stub shaft carrying a sprocket wheel adapted to be driven from the pinion, a chain for driving the stub shaft from the pinion, said stub shaft having upon one end means for engaging the engine to turn it over, the crank shaft adapted to be moved rearwardly whereby the stub shaft is moved into engagement with the engine shaft.

Signed at Streator county of La Salle and State of Illinois, this 28th day of May, 1925.

MARK ANTHONY.